United States Patent
Aoyama et al.

(10) Patent No.: US 6,653,590 B1
(45) Date of Patent: Nov. 25, 2003

(54) PROJECTION BOLT WELDING DEVICE

(75) Inventors: Yoshitaka Aoyama, Osaka (JP); Shoji Aoyama, Osaka (JP)

(73) Assignee: Yoshitaka Aoyama, Osaka (JP)

( * ) Notice: Subject to any disclaimer, the term of this patent is extended or adjusted under 35 U.S.C. 154(b) by 22 days.

(21) Appl. No.: 09/787,153

(22) PCT Filed: Sep. 7, 2000

(86) PCT No.: PCT/JP00/06082
§ 371 (c)(1),
(2), (4) Date: Jan. 23, 2002

(87) PCT Pub. No.: WO01/85380
PCT Pub. Date: Nov. 15, 2001

(51) Int. Cl.[7] .............................. B23K 11/14; B23K 9/28
(52) U.S. Cl. ...................................... 219/86.25; 219/93
(58) Field of Search ................................ 219/86.25, 93

(56) References Cited

U.S. PATENT DOCUMENTS

| | | | | |
|---|---|---|---|---|
| 4,229,637 A | * | 10/1980 | Dederer et al. | 219/86.25 |
| 5,074,742 A | * | 12/1991 | Aoyama | 198/468.5 |
| 5,105,060 A | * | 4/1992 | Tanaka et al. | 219/78.01 |
| 5,146,062 A | * | 9/1992 | Koda et al. | 219/93 |
| 5,233,151 A | * | 8/1993 | Aoyama | 219/98 |
| 5,248,058 A | * | 9/1993 | Aoyama | 221/165 |
| 5,285,929 A | * | 2/1994 | Aoyama | 221/165 |
| 5,359,171 A | * | 10/1994 | Aoyama | 219/93 |
| 5,508,488 A | * | 4/1996 | Aoyama et al. | 219/93 |
| 5,798,494 A | * | 8/1998 | Aoyama et al. | 219/98 |
| RE35,914 E | * | 10/1998 | Aoyama | 219/93 |
| 6,011,234 A | * | 1/2000 | Kirchner et al. | 219/98 |

FOREIGN PATENT DOCUMENTS

| | | | | |
|---|---|---|---|---|
| JP | 359127975 A | * | 7/1984 | |
| JP | 361235082 A | * | 10/1986 | |
| JP | 01306079 A | * | 11/1989 | |
| JP | 0434350 A2 | * | 6/1991 | |
| JP | 07300228 A | * | 11/1995 | |
| JP | 408001353 A | * | 1/1996 | |
| JP | 02000015456 A | * | 1/2000 | |
| JP | 02001047250 A | * | 2/2001 | |
| JP | 02001314975 A | * | 11/2001 | |
| JP | 2001321958 A | * | 11/2001 | |

OTHER PUBLICATIONS

WO 01/85380 A1 Aoyama (Nov. 15, 2001).*

* cited by examiner

*Primary Examiner*—Tom Dunn
*Assistant Examiner*—Kiley Stoner
(74) *Attorney, Agent, or Firm*—J.C. Patents

(57) ABSTRACT

A projection bolt feed unit (14) is mounted on a welding frame (5) which is made to move by a robot system (1), and on either one of two electrodes (6, 7) installed on the welding frame (5) is formed a receiving hole (9) in which to insert a shaft (11). The projection bolt (10) held in said unit (14) stops at the position where its shaft (11) is coaxial with the receiving hole (9), and then the shaft (11) is inserted into the receiving hole (9). After that, the welding frame (5) reaches the work (33) on standby, to weld the projection bolt (10) to the work (33).

8 Claims, 2 Drawing Sheets

PROJECTION BOLT WELDING DEVICE

TECHNICAL FIELD

The present invention concern a welding system for welding a projection bolt composed of a shaft, a flange and a projection to a sheet-like work.

BACKGROUND ART

In the Japanese Patent Publication No. 2509103 is disclosed a technology of forming a receiving hole in which to insert the shaft of a projection bolt in a movable electrode so that the projection bolt held in the movable electrode is welded to a work such as steel sheet with an advancement of that electrode.

With the prior art as described above, the work must be moved in the case of a large work such as floor panel of automobile, etc. because the welding system itself is of stationary type, and the mechanism for it becomes extremely large in scale and, therefore, impracticable. As alternative, one may think of adopting a movable type welding system, but in that case special consideration must be given to the unit feeding projection bolts to the electrode. Namely, in installing a projection bolt feed unit on the welding system, a system advantageous for the feed to electrode must be applied. Moreover, the projection bolt composed of a shaft, a flange and a projection for welding must be held accurately, to obtain a good welding quality.

DISCLOSURE OF INVENTION

The projection bolt welding system according to the present invention is a system for welding a projection bolt composed of a shaft, a flange formed at one end of the shaft and a projection for welding formed on the surface of the flange opposite to the shaft to a sheet-like work, comprising a welding frame which is made to move to required point by a robot system, a movable electrode and a fixed electrode installed on the welding frame, a receiving hole being formed in one of the two electrodes for receiving the shaft of the projection bolt, and a projection bolt feed unit attached to the welding frame. The shaft is inserted in the receiving hole from the projection bolt feed unit and, in that state, the welding frame moves to a prescribed point of the work where the projection for welding and the work are pressed against each other to energize and perform welding. Since the welding frame and the projection bolt feed unit are integrated into a single unit as described above, it becomes possible to move the electrode to the target point on the work to complete welding while feeding bolts to the electrode and, therefore, there is no need of installing any special equipment for moving a large work.

The projection bolt feed unit may be disposed behind the electrode as seen from the direction of advancement of the welding frame. When the welding frame advances toward the work, it is important that the electrode holding the projection bolt reaches the welding point at its foremost position. It means that the projection bolt feed unit must not put any obstacle to the advancement of the welding frame. If the projection bolt feed unit was installed in front of the welding frame, this feed unit would interfere with other members in the surrounding area, making it impossible to perform welding of the bolt at any desired point. Since there is no problem of interference by the feed unit as explained above, a good welding behaviour is realized.

The projection bolt feed unit may comprise a forward-backward moving feed rod, a holding head attached to the feed rod, and a drive unit for inserting the shaft of projection bolt into the receiving hole. Since the forward-backward moving feed rod protrudes from or retreats into the welding frame, the projection bolt fastened to the holding head is transferred successfully to a position between the two electrodes. Especially, as the shaft stops advancement of the feed rod at the position coaxial with the receiving hole, the movement of the shaft to the receiving hole can be made with good accuracy. The shaft, which is inserted into the receiving hole with an output of the drive unit, can ensure a feed of high reliability following the advancement of the feed rod.

The drive unit is fixed to the arm member of the welding frame, the forward-backward moving drive unit of the feed rod is fixed to the output member of the drive unit, and the feed rod is provided in a way to tilt in two directions against the arm member. With this construction, the shaft of the projection bolt held in the holding head stops at the position coaxial with the receiving hole, and is inserted into the receiving hole from that position. Because a forward-backward moving drive unit for the feed rod and a drive unit for guiding the shaft to the receiving hole are provided, the transfer of the bolt to a position between the two electrodes and the insertion of the shaft into the receiving hole can be performed accurately, and this behaviour is realized especially with the fact that the forward-backward moving drive unit is fixed to the output member of the drive unit. Moreover, since the feed rod can be tilted in two directions against the arm member, it becomes possible to move the projection bolt to a position between the two electrodes, and to attach a projection bolt feed unit to the welding frame to combine them into a single unit easily.

BEST MODE FOR CARRYING OUT THE INVENTION

An embodiment of the present invention will be described in detail with reference to the drawings.

Figure 1:
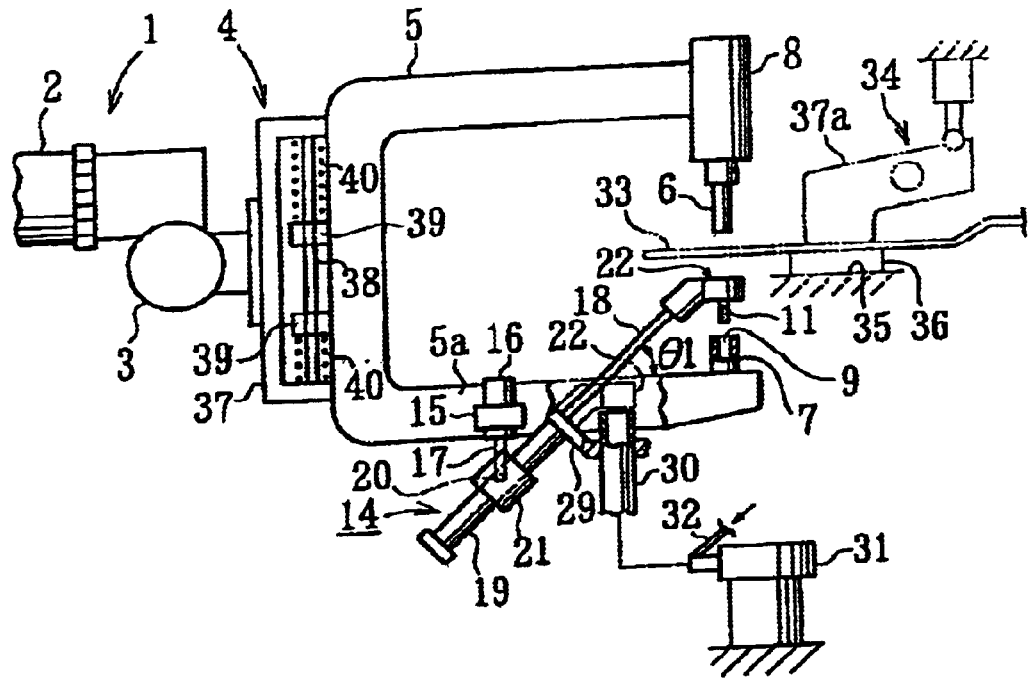
FIG. 1 is a side view of the projecting bolt welding system showing an embodiment of the present invention.

In FIG. 1, generically indicated with the reference numeral 1 is a robot system, where only an arm 2 and an articulatory joint 3 corresponding to the tip portion of that system are illustrated. The robot system 1 is of generally adopted 6-shaft type. To the articulatory joint 3 is coupled a welding frame 5 through an equalizer 4.

There are various forms of welding frame 5, but C type is given as example here. It may be X type instead of C type. At the tip of the welding frame 5 are installed a movable electrode 6 and a fixed electrode 7. The movable electrode is driven by an air cylinder 8 connected to the welding frame 5. An electric motor may be adopted in place of this air cylinder. The two electrodes 6, 7 are installed coaxially, and either of them has a receiving hole in which to insert the shaft of the projection bolt. In this embodiment, a receiving hole 9 is formed in the fixed electrode 7.

Figure 4:
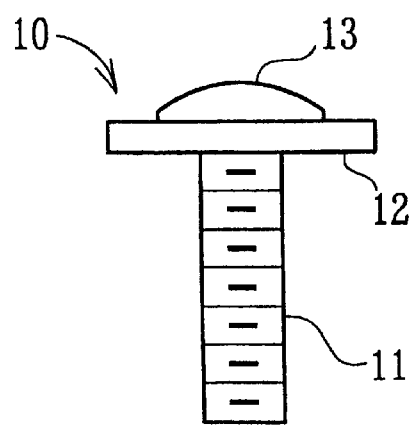
FIG. 4 is a side view of the projecting bolt.

As shown in FIG. 4, an iron projection bolt is indicated with reference numeral 10, which is composed of a shaft 11, a round flange 12 integrated to it, and a projection for welding 13 formed on the flange face on the side opposite to the shaft 11. The projection for welding may also take the form of 3 or 4 projections in the shape of "wart" protruding on a flat flange face.

The projection bolt feed unit, which is indicated with reference numeral 14, is disposed on the rear side of the electrodes 6, 7 as seen in the direction of advancement of the welding frame 5, i.e. in the direction of the work on standby at an isolated point (right side in FIG. 1). In other words, when the welding frame 5 advances, the electrodes 6, 7 advance at the foremost position, and the feed unit is positioned behind them.

The laterally extending portion of the welding frame 5 is an arm member 5a, to the side face of which is fixed a bracket 15, and to this bracket is attached an air cylinder 16 which is a drive unit. To the piston rod 17 corresponding to the output member of the drive unit is fixed a forward-backward moving drive unit 19 of the feed rod 18. This unit 19 is composed of an air cylinder, and the piston rod 17 and the air cylinder 19 are integrated into a single unit through a coupling arm 20 and a coupling cylinder 21 attached to the air cylinder 19. Electric motors may be adopted in place of the air cylinders 16, 19. When electric motors are adopted, a mechanism for converting the rotation of each motor into a linear reciprocating motion is interposed.

Figure 2:
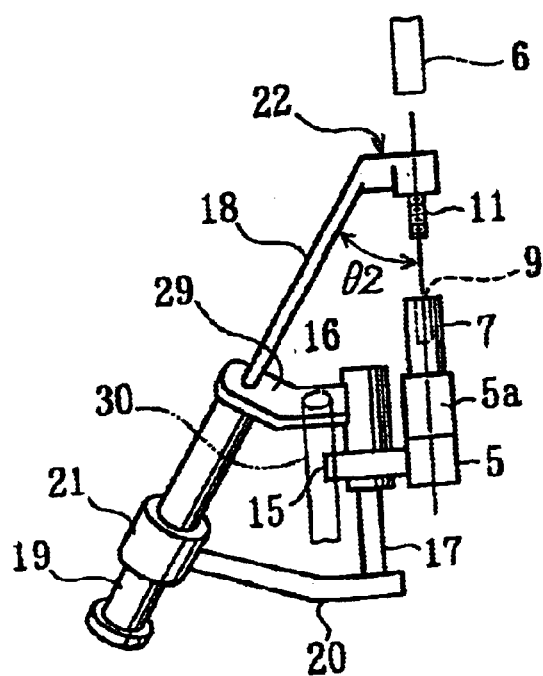
FIG. 2 is a drawing showing part of FIG. 1 as seen from the right side.

The feed rod 18 is tilted in two directions, or in two planes, against the arm member 5a. The tilting is set for inclination at an angle of θ1 as seen in the direction of FIG. 1 and inclination at an angle of θ2 as seen in the direction of FIG. 2. Namely, the feed rod 18 and the arm member 5a are skew lines. To the tip of the feed rod 18 is coupled a holding head 22, so that the shaft 11 of the projection bolt held therein may be coaxial with the axis of the receiving hole 9 when the holding head 22 advances.

Figure 3:
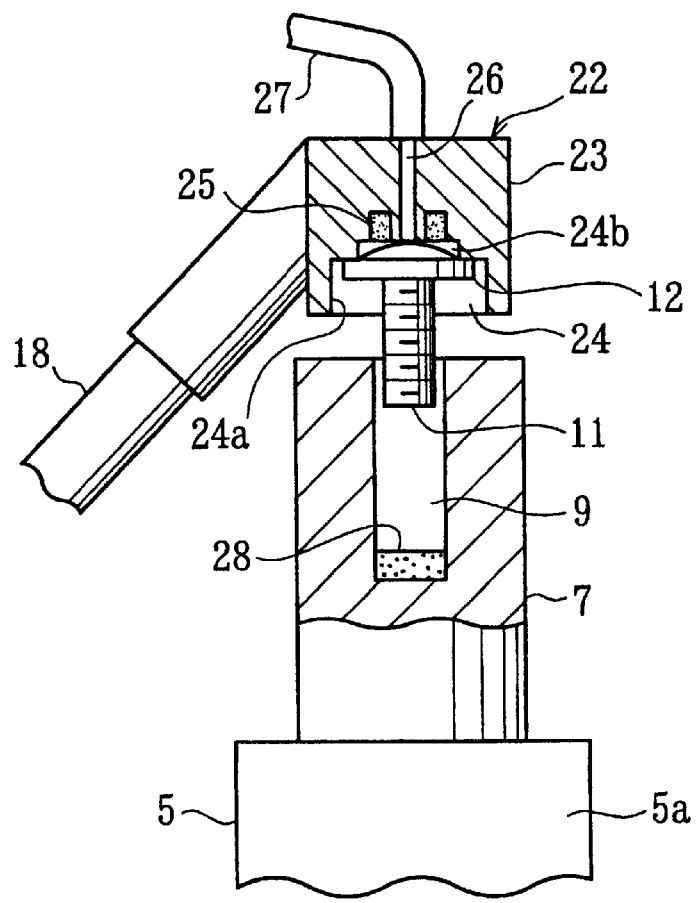
FIG. 3 is a longitudinal sectional view showing the relation between the holding head and the receiving hole.

The axis of the holding head 22 crosses the axis of the feed rod 18 at an acute angle. As shown in FIG. 3, in the head body 23 is formed a round concavity 24 open downward, in which to house a flange 12. Since a projection for welding 13 is integrated to the flange 12, in the concavity 24 are formed a large-diameter portion 24a for the flange 12 and a small-diameter portion 24b for the projection for welding 13 to also house that projection. In the depth of the concavity 24 is embedded a magnet (permanent magnet) 25, which temporarily retains the projection bolt 10 in a stable state by attracting the flange 12 placed in the concavity 24. The state at this time is that the outer circumference of the flange 12 is in close contact with the bottom face of the large-diameter portion 24a.

An air passage 26 is provided at the central part of the head body 23, and is open at the bottom of the small-diameter portion 24b. The flange 12 is made to get away forcibly from the concave portion 24 in resistance to the attraction of the magnet 25, with the compressed air from the air passage 26, to make the shaft 11 move completely into the receiving hole 9. The timing of feed of compressed air is set at the moment when part of the shaft 11 entered into the receiving hole 9. The reference numeral 27 denotes an air hose connected to the air passage 26, while 28 denotes a magnet (permanent magnet) installed at the depth of the receiving hole 9 and this magnet 28 attracts and securely holds the bolt 10 which moved into the receiving hole 9. In the case where the top and the bottom of FIG. 3 are reversed, holding of the bolt by the magnet 28 becomes essential.

When the feed rod 18 is at its retreat position, it is necessary to enable the flange 12 to advance into the concavity 24. For that purpose, a parts feed pipe 30 is connected to the bracket 29 fixed to the air cylinder 19, and its end agrees with the holding head 22 (illustrated with two-dot chain line in FIG. 1). A parts feed pipe 30 is connected to the parts feeder 31, and the bolt is carried up to the holding head 22 by the compressed air from an air hose 32.

The work 33 of steel sheet is fixed firmly by a clamp unit 34. This unit 34, which is an ordinary one, is a type with which the work 33 is pinched strongly between a base 36 fixed to a stationary member 35 and a rotary clamp arm 37a. When the welding frame 5 is returned, the work 33 is positioned at a separate point, but FIG. 1 indicates a state in which the welding frame 5 advanced to be positioned between the two electrodes 6 and 7.

The equalizer 4 is intended to make the entire welding frame 5 go up, as the movable electrode 6 advances with the air cylinder 8 to hit against the work 33, with the reaction force of that advancement, to press fit the fixed electrode 7 to the bottom face of the work 33. For that purpose, a channel-shaped frame member 37 is fixed to the articulatory joint 3, and a working shaft 38 installed on the frame member 37 slidably extends through brackets 39 fixed to the welding frame 5. Between each of the brackets 39 and an end wall of the frame member 37 is interposed a compression coil spring 40. As the reaction force by advancement of the movable electrode 6 acts on the welding frame 5, one of the compression coil springs 40 is compressed, resulting in an equalizing action.

The action of the above-described embodiment will now be explained. When the holding head 22 is at the position indicated with two-dot chain line in FIG. 1, the projection bolt 10 is sent from the parts feeder 31. At that time, the flange 12 and the projection for welding 13 of the bolt are housed in the concavity 24, and the shaft 11 protrudes downward from the holding head 22. Next, the feed rod 18 advances until at the position where the shaft 11 and the receiving hole 9 become coaxial with each other. After that, as the entire feed rod 18 is advanced by the action of the air cylinder 16, the shaft 11 advances into the receiving hole 9, and the shaft 11 i.e. the projection bolt 10 completely gets into the receiving hole 9 by the action of the compressed air from the air passage 26. Then, the holding head 22 returns to its initial position through a locus in reverse.

Next, as the welding frame 5 advances by the action of the robot system 1, the two electrodes 6 and 7 reach the work 33 which was on standby at a position away from the welding frame 5. As the movable electrode 6 advances after that, the equalizer 4 works to press the projection for welding 13 against the bottom face of the work 33 to energize and complete welding. When the movable electrode 6 retreated after welding of a first piece of the projection bolt 10, the welding frame 5 moves, by the action of the equalizer 4, to form a space between the fixed electrode 7 and the work 33. The holding head 22 advances into this space to feed the shaft 11 of a second piece of the projection bolt into the receiving hole 9 again, and perform welding. Namely, in the state in which the work 33 is installed between the two electrodes 6 and 7, the welding of projection bolts 10 is performed successively one after another.

The successive welding ensures the reduction of the moving locus of the welding frame 5, which in turn is effective for improvement in the working efficiency. The same action can be obtained even if the entire system in FIG. 1 is arranged upside down.

What is claimed is:

1. A projection bolt welding system for welding a projection bolt having a shaft to a work piece, comprising:

a welding frame which is made to move to required point by a robot system, a movable electrode and a fixed electrode installed on said welding frame, having a receiving hole for receiving said shaft formed in one of said two electrodes, and a projection bolt feed unit attached to said welding frame comprising a drive unit fixed to said welding frame for driving said projection bolt feed unit along a direction substantially parallel to an axis of said receiving hole, while substantially not causing a movement of said projection bolt feed unit in a direction perpendicular to said axis.

2. A projection bolt welding system for welding projection bolt as defined in claim 1, wherein said projection bolt feed unit is disposed behind the fixed electrode as seen from the direction of advancement of said welding frame.

3. A projection bolt welding system for welding projection bolt as defined in claim 2, wherein said projection bolt feed unit further comprises a forward-backward moving feed rod and a holding head attached to said feed rod, and wherein a forward-backward moving drive unit of said feed rod is fixed to said drive unit.

4. A projection bolt welding system for welding projection bolt as defined in claim 1, wherein said projection bolt feed unit further comprises a forward-backward moving feed rod and a holding head attached to said feed rod, and wherein a forward-backward moving drive unit of said feed rod is fixed to said drive unit.

5. A projection bolt welding system for welding projection bolt as defined in claim 4, wherein said drive unit is fixed to an arm member of said welding frame, the forward-backward moving drive unit of said feed rod is fixed to an output member of said drive unit, and said feed rod is provided in a way to tilt in two directions against said arm member, to thereby stop the shaft of said projection bolt held in said holding head at the position coaxial with said receiving hole, and insert said shaft into said receiving hole from that stop position.

6. A projection bolt welding system for welding projection bolt as defined in claim 1, wherein said welding frame is coupled to said robot system through an equalizer.

7. A projection bolt welding system for welding a projection bolt having a shaft to a word piece, comprising a welding frame which is made to move to required point by a robot system, a movable electrode and a fixed electrode installed on said welding frame, having a receiving hole for receiving said shaft formed in one of said two electrodes, and a projection bolt feed unit attached to said welding frame, said projection bolt feed unit comprising
a forward-backward moving feed rod,
a holding head attached to said feed rod, and
a drive unit for inserting the shaft of said projection bolt into said receiving hole, said drive unit being fixed to an arm member of said welding frame, a forward-backward moving drive unit of said feed rod being fixed to an output member of said drive unit, and said feed rod being provided in a way to tilt in two directions against said arm member, to thereby stop the shaft of said projection bolt held in said holding head at a position coaxial with said receiving hole, and insert said shaft into said receiving hole from that stop position.

8. A projection bolt welding system for welding projection bolt having a shaft and a flange formed at one end of the shaft to a work piece, comprising:

a welding frame which is made to move to a required point by a robot system;

a movable electrode and a fixed electrode installed on said welding frame, having a receiving hole for receiving said shaft formed in one of said two electrodes; and a projection bolt feed unit attached to said welding frame through a drive unit fixed to an arm member of said welding frame, the projection bolt feed unit comprising a holding head, wherein the holding head has a concavity for receiving said flange of said projection bolt, a magnet is embedded in a bottom of said concavity, an air passage is also provided on the bottom of said concavity.

* * * * *